United States Patent [19]

Hockaday

[11] Patent Number: 5,309,772

[45] Date of Patent: May 10, 1994

[54] SELF-EXCITING OPTICAL STRAIN GAGE

[75] Inventor: Bruce Hockaday, Vernon, Conn.

[73] Assignee: United Technologies Corporation, Hartford, Conn.

[21] Appl. No.: 923,770

[22] Filed: Aug. 3, 1992

[51] Int. Cl.$^5$ ............................................. G01L 1/10
[52] U.S. Cl. .................................. 73/862.59; 73/800; 356/35.5
[58] Field of Search ...................... 73/862.59, 800, 653; 356/352, 35.5; 257/417

[56] References Cited

U.S. PATENT DOCUMENTS

| 4,777,358 | 10/1988 | Nelson | 356/35.5 |
|---|---|---|---|
| 4,815,855 | 3/1989 | Dixon | 73/862.59 |
| 4,912,990 | 4/1990 | Norling | 73/862.59 |
| 4,970,903 | 11/1990 | Hanson | 356/35.5 |
| 5,101,664 | 4/1992 | Hockaday et al. | 73/704 |

FOREIGN PATENT DOCUMENTS 1388711 4/1988 U.S.S.R. .............................. 356/35.5

Primary Examiner—Richard E. Chilcot, Jr.
Assistant Examiner—Elizabeth L. Dougherty
Attorney, Agent, or Firm—Troxell K. Snyder

[57] ABSTRACT

A self-exciting optical strain sensor (20) includes dual parallel bridges (22,24) having parallel facing surfaces (32,34). Light energy (38) entering a Fabry-Perot cavity (36) formed by this surfaces (32,34) induces a periodic buildup and release of energy in the cavity (36) which is directly related to the natural resonant frequency of the bridges (22,24). Analysis of the intensity of light emitted (50) from the cavity (36) determines the bridge natural frequency.

3 Claims, 1 Drawing Sheet

SELF-EXCITING OPTICAL STRAIN GAGE

FIELD OF THE INVENTION

The present invention pertains to an optical sensor responsive to strain in a substrate.

BACKGROUND

Optical strain gages, and in particular an optical strain gage useful in a pressure transducer, are known in the art. U.S. Pat. No. 5,101,664, Optical Pressure Transducer, issued on Apr. 7, 1992 to Hockaday, et al shows a micromachine silicon pressure transducer which employs a single vibrating bridge and pressure responsive diaphragm formed from a single silicone wafer. The initial wafer is micromachined by a combination of etching and laser techniques so as to result in a single strand of silicon supported at each end by blocks or other supports also cut from the initial silicon wafer.

By forming the diaphragm, supports, and bridge from a single slab of homogeneous material, a pressure transducer according to Hockaday, et al is virtually unstrained by changes in temperature due to the uniformity of the thermal expansivity of the integral structure.

The degree of strain experienced by the bridge in the Hockaday configuration is determined by exciting the bridge structure by the use of a beam of light which is pulsed in intensity at a frequency equal to the nominal natural frequency of the bridge plus any strain-induced change in frequency. Optical devices, discussed in more detail in the Hockaday patent, monitor the vibration frequency of the bridge through the use of reflected light analyzed by an interferometer, and varies the pulse frequency of the driving light beam until the resident frequency of the bridge has been determined.

The amount of strain in the bridge is a function of the modulus of elasticity, geometry, and longitudinal stress present in the bridge, which in turn may be easily converted to strain at the surface of the diaphragm. The prior art device thus provides an effective, simple transducer for making temperature independent strain measurements, but requiring a relatively complicated measuring system able to interpret the measured frequency of the bridge and vary the driving frequency of the pulsed beam in order to seek out the current resonant bridge frequency.

SUMMARY OF THE INVENTION

The present invention provides a self exciting optical strain sensor which is highly resistant to thermally induced strain. The sensor comprises a pair of parallel bridge elements supported above a substantially planar substrate, the substrate, supports, and bridge elements all having been cut from a single, uniformly doped silicon wafer.

The sensor according to the present invention is formed from silicon having a <110> crystal structure. In this way, the facing walls of the parallel bridges are formed with substantially parallel alignment as these walls must lie in the same family of <111> crystal planes.

The sensor according to the present invention is driven by an unmodulated beam of light, transmitted through one of the bridges, which enters a Fabry-Perot cavity defined by the parallel facing bridge walls. By forming the facing walls with a proper initial spacing, an optical intensity buildup will occur within the cavity when supplied by the unmodulated light. This optical intensity buildup causes a transverse thermal gradient within the parallel bridge elements, which in turn causes lateral displacements of the bridge elements. This lateral displacement "detunes" the cavity, thereby reducing the optical intensity therewithin.

As cavity optical intensity diminishes, the bridges' thermal gradients are reduced, and the bridges return to the original spacing, and are thus prepared to repeat this cycle. The bridges and the intensity of the light within the cavity thus occilate at a frequency which is responsive to the natural frequency, and hence imposed stress, of the bridges.

As noted above, the sensor according to the present invention and its integral supports and substrate, are cut from a single uniformly doped silicon wafer, thus eliminating differential thermal expansion. Another advantage of the sensor according to the present invention is the simplicity of the measurement apparatus used to drive and monitor the sensor. Due to the self excitation feature of this sensor, the driver is an unmodulated light source, while the vibration measuring apparatus merely detects the cyclic intensity variation in the light reflected or transmitted from the cavity.

The sensor is thus well suited for inclusion in a fully optical pressure sensor, wherein the silicon substrate forms the pressure diaphragm. Such a pressure sensor would be electrically passive, small in size, and capable of operating over an extreme temperature range without reduced accuracy or calibration problems. Other potential applications of the strain sensor according to the present invention can include, acceleration monitors, temperature monitors, or other devices, each of which would use the same driving and monitoring apparatus discussed above.

DETAILED DESCRIPTION

Figure 1:
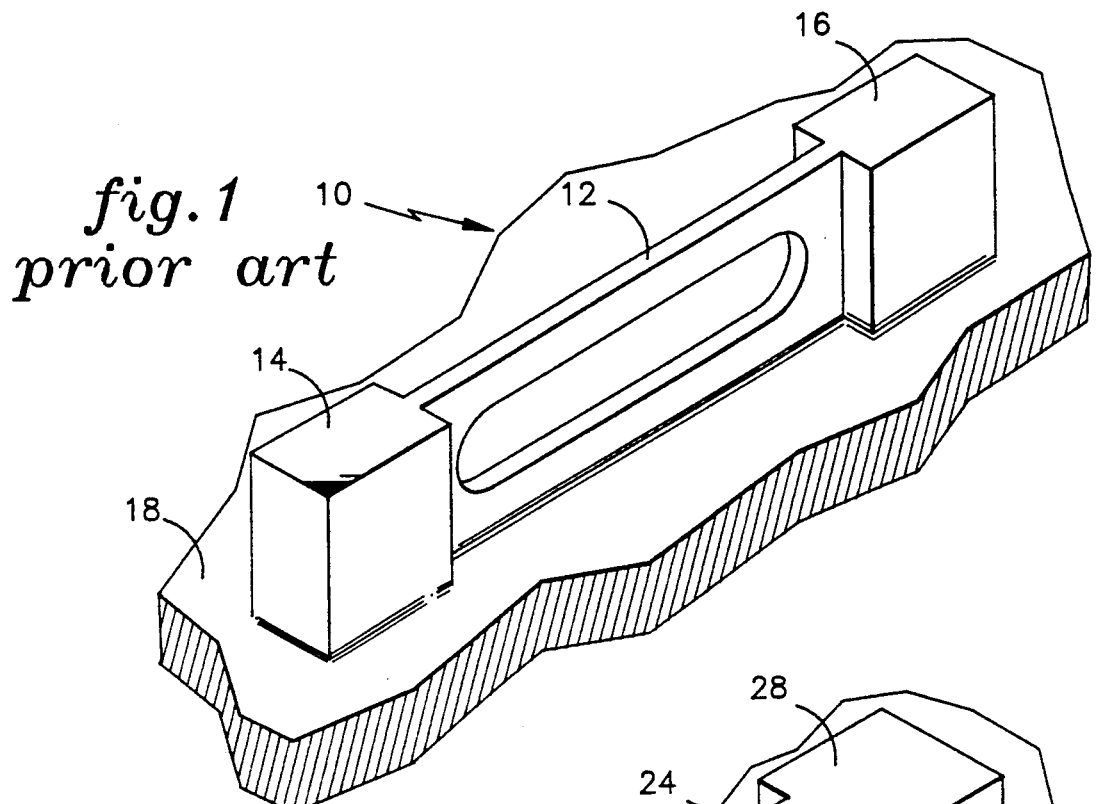
FIG. 1 shows a prior art single bridge sensor configuration.

Referring to the drawing figures, and in particular to FIG. 1 thereof, a prior art, single bridge strain gage 10 as shown and described in more detail in the reference of Hockaday described above. The single bridge is formed from a single silicon wafer which is cut by means of chemical and laser etching techniques to result in the single bridge 12 extending between first and second end supports 14, 16 and suspended above a substrate 18. It is also noted in the background section of this specification, the substrate 18 supports 14, 16 and bridge 12 are essentially a monolithic structure cut from a uniformly doped crystallized silicon wafer. The material properties are thus identical throughout structure the structure of FIG. 1 eliminating the possibility of any differential thermal expansion, and hence the imposition of any residual or thermal stress between any of the aforementioned elements.

Figure 2:
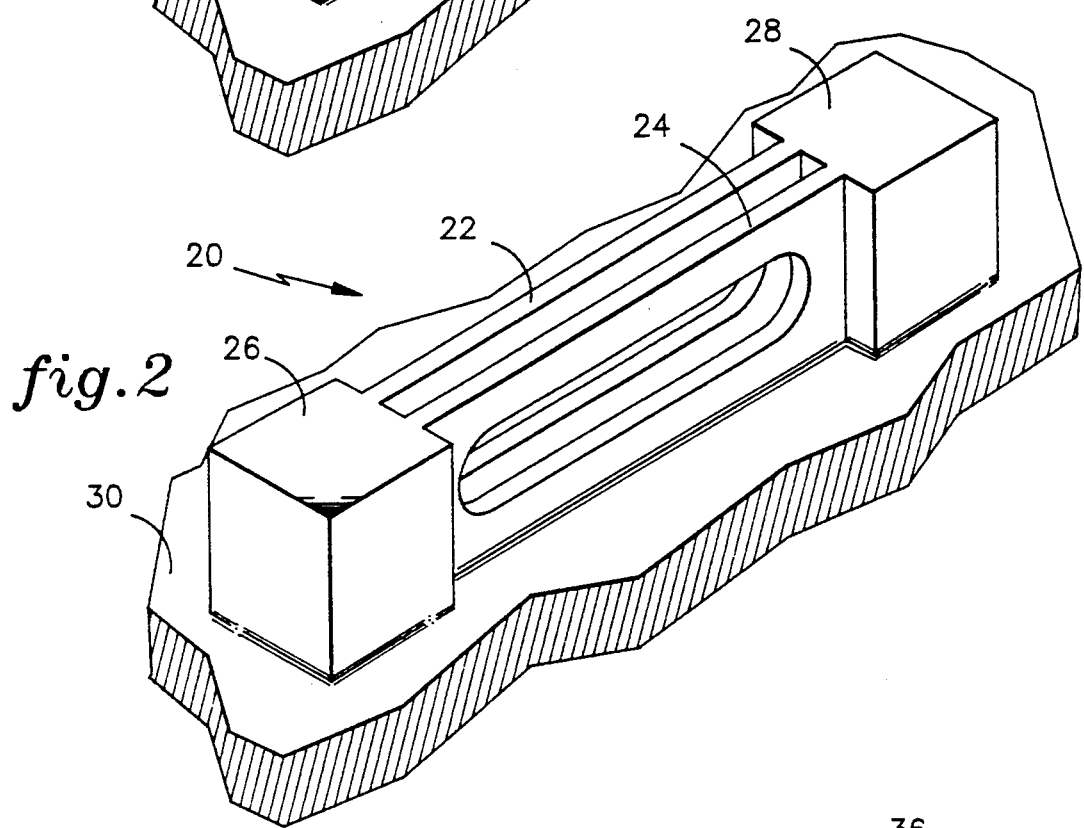
FIG. 2 shows a dual parallel bridge structure according to the present invention.

FIG. 2 shows a dual parallel bridge configuration 20 according to the present invention. Parallel bridges 22, 24 extend between support members 26, 28 which support the bridges 22, 24 above the integral substrate 30. The bridges 22, 24 and supports 26, 28 may be formed by a variety of methods, including the laser chemical etchant process described in the Hockaday, et al reference, as well as by a variety of other micromachining techniques.

The individual bridges 22, 24 possess a natural resonant frequency which is dependant upon the geometry of the individual bridges, i.e. cross-sectional moment of inertia and length, material properties, i.e. modulus of elasticity, and the residual or imposed longitudinal stress on the bridge elements 22, 24, i.e. restoring force. As the geometry and material of the bridges remains substantially constant, the imposed longitudinal stress exerted by the supports 26, 28 as a result of the deformation of the substrate 30 results in a variation of the natural resonant frequency of the individual bridges 22, 24.

Figure 3:
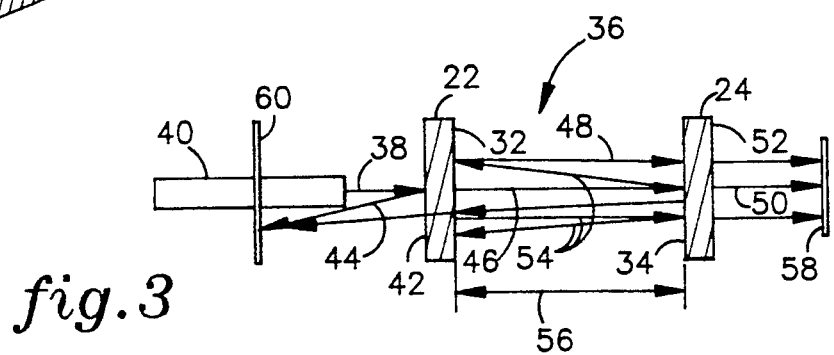
FIG. 3 shows a simplified schematic representation of the Fabry-Perot cavity and the reflected/transmitted light paths.

The instant natural resonant frequency of the bridges 22, 24 is sensed by means of the optical arrangement shown schematically in FIG. 3. FIG. 3 is a transverse cross-section of the bridges 22, 24 at a point intermediate the supports 26, 28. The parallel facing surfaces 32, 34 of the respective bridges 22, 24 form a Fabry-Perot cavity 36 shown in the figure. Surfaces 32, 34 are spaced apart a distance based on the wavelength of lights used to drive the sensor, as well as the manufacturability of the structures. Thus, a spacing of approximately 10 microns, or roughly in the range of 10–20 wavelengths is believed to provide good performance.

The Fabry-Perot cavity 36 is energized by means of a beam of light 38 supplied, for example, by a fiber optic cable 40 which is directed against an exterior face 42 of the bridge 22. The light beam 38, unmodulated in intensity, is partially reflected 44 and partially transmitted 46 by the bridge 22. The surface reflectivity of a strain gage according to the present invention formed from a typical silicon wafer is on the order of 30%. Thus, 49% of the light energy of the encountering beam 38 enters the cavity 36 whereupon it is both partially reflected 48 and partially transmitted 50 by the second bridge element 24.

In the absence of the existence of the Fabry-Perot cavity 36, approximately 24% of the light energy in beam 38 would exit the outward facing surface 52 of the second bridge element 24. The Fabry-Perot cavity 36, however, achieves an optical intensity buildup by means of constructively adding the reflecting and re-reflecting 54 light within the cavity 36. This intensity, and hence energy, buildup in the cavity 36 results in the creation of a transverse thermal gradient in each of the bridge elements 22, 24. The gradient causes a lateral deformation of the elements 22, 24 changing the spacing 56 between the facing surfaces 32, 34.

By changing the spacing 56 between the surfaces 32, 34, the cavity 36 becomes detuned, which means that the cavity 36 becomes unable to constructively add the multiple reflections 54 thereby allowing the optical intensity within the cavity 36 to drop and the resulting thermal gradients to disappear.

The bridge elements 22, 24 thus return to their original spacing 56 thereby permitting a succeeding buildup of optical intensity within the cavity 36 and the resulting cyclical transverse deformation and restoration of the bridge elements 22, 24.

Bridge elements 22, 24 thus are induced to vibrate at or near their instant natural frequency merely by the imposition of an unmodulated light beam 38 thereby achieving the self excitation feature recited above. The frequency of the vibrating bridges 22, 24 is measured by means of an optical intensity sensor 58 positioned opposite the fiber optic transmitter 40 for measuring the intensity of light transmitted from within the cavity 36. As will be appreciated by those skilled in the art, the variation of optical intensity within the cavity 36, occurring at a frequency equal to that of the vibrating bridges 22, 24, also causes the intensity of the transmitted light 50 to increase and decrease in concert with the frequency of vibration of the bridges 22, 24.

Alternatively, the frequency of the variation and intensity of the light reflected and emitted 44 from the outward face 42 of the bridge 22, may also be measured by a suitable sensor 60, and will likewise have a frequency of intensity variation identical to the vibration frequency of the bridges 22, 24.

As noted in the Hockaday, et al reference for the single bridge configuration, it is advantageous to form the dual bridge arrangement according to the present invention from a single slab of <110> silicon. In this fashion, the faces 32, 34 of the bridges 22, 24 will remain absolutely parallel due to the configuration of the crystalline structure of the silicon. This unfailing parallel alignment insures proper operation of the Fabry-Perot cavity 36.

Exemplary dimensions of a dual bridge configuration according to the present invention would propose a pair of dual bridges, having a gap of 10 microns between the facing surfaces 32, 34, each bridge having a length of 1000 microns, a height of 40 microns, and a thickness of 2.5 microns. The value of Youngs modulus in the relevant orientation of <110> silicon is $1.69E11\ N/m^2$, while the density of crystalline silicon is $2.33E3\ kg/m^3$. Calculations show the resonant frequency of this structure to be 22 kHz in the unstressed or no strain applied state.

As noted above, the structure according to the present invention, being cut or formed from a single monolithic piece of silicon is virtually unaffected by temperature due to the uniformity of the material coefficient of thermal expansion throughout the structural elements. There is, however, a slight variation in the value of Youngs modulus which has been found to be $-62.5$ ppm/C. As will be appreciated by those skilled in the art, this thermally induced change in the silicon material properties causes a slight change in the natural frequency of the bridge elements 22, 24.

I claim:

1. An optical strain gage comprising:
   first and second bridges, each bridge extending between first and second end supports, said bridges and supports having been cut from a single, uniformly doped silicon wafer;
   said first bridge including a reflective wall facing the second bridge;
   said second bridge including a reflective wall parallel to and facing the first bridge wall, the parallel bridge walls defining cavity therebetween;
   means for transmitting light transversely into the first bridge, wherein the transmitted light is reflected between the first bridge wall and the second bridge wall, resulting in a buildup of the intensity of light energy within the cavity, aid buildup inducing vibration in said first and second bridges, the frequency of vibration being related to the strain imposed on the wafer, and
   means, disposed adjacent the bridges, for sensing the vibration frequency of the bridges by measuring the frequency of the variation in the intensity of light energy within the cavity.

2. The strain gage as recited in claim 1, wherein the wafer has a crystalline structure defined in the <110> plane, and wherein the parallel walls of the first and second bridges lie in said <110> plane.

3. The strain gage as recited in claim 1, wherein the light transmitting means provides an unmodulated beam of light into said first bridge.

* * * * *